United States Patent [19]

Bernson, Jr.

[11] 4,315,577
[45] Feb. 16, 1982

[54] CLOSURE ASSEMBLY

[76] Inventor: Albert Bernson, Jr., Dallas, Tex.

[21] Appl. No.: 219,349

[22] Filed: Dec. 22, 1980

[51] Int. Cl.³ .............................................. B65D 45/28
[52] U.S. Cl. .................................... 220/323; 220/315;
292/256.65; 292/256.67
[58] Field of Search ....................... 220/315, 319, 323;
292/256.65, 256.67

[56] References Cited

U.S. PATENT DOCUMENTS

| 2,162,663 | 6/1939 | Lockhart | 292/256.65 |
| 2,616,587 | 11/1952 | Petch | 220/319 X |
| 3,997,078 | 12/1976 | Melton et al. | 220/315 |
| 4,102,474 | 7/1978 | Platts | 220/323 |

Primary Examiner—George T. Hall
Attorney, Agent, or Firm—Gerald G. Crutsinger; John F. Booth; Monty L. Ross

[57] ABSTRACT

A closure assembly comprises a closure body adapted to be disposed in an opening in a structure. A closure body has a spirally disposed groove provided therein. A retaining member is made to be flexible for movement within the groove. Apparatus is operably connected to the closure body for moving the retaining member through the groove to a position wherein a portion of the retaining member engages the structure. The retaining member is further made of a size and material having sufficient shear strength to prevent movement of the closure body when the pressure applied thereto generates a force against said retaining member.

14 Claims, 6 Drawing Figures

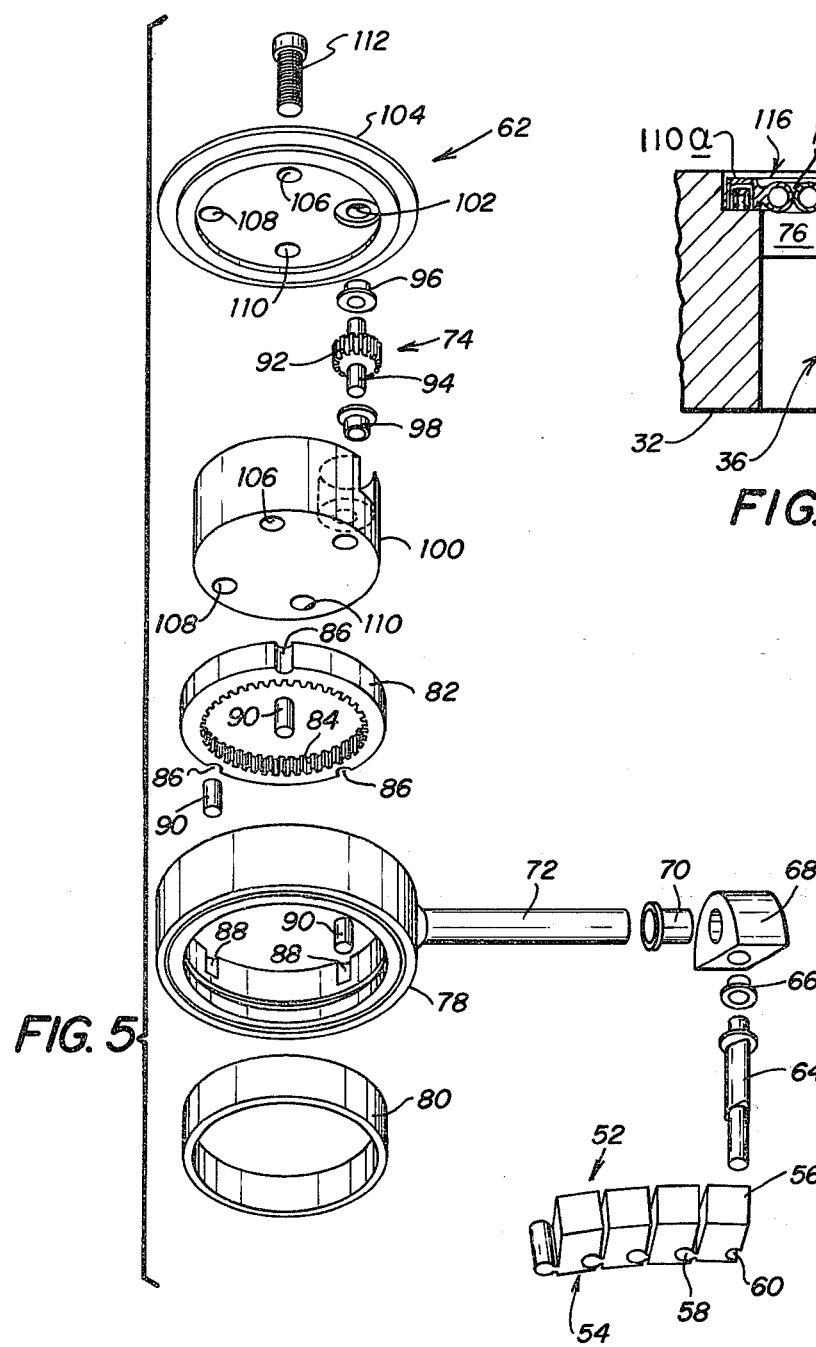
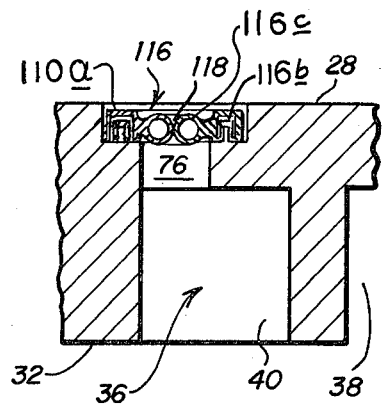
FIG. 5
FIG. 6

CLOSURE ASSEMBLY

BACKGROUND OF INVENTION

Closure devices are used to seal or close an opening, which is in communication with pressure or vacuum in pressure vessels. Some examples of these closures are disclosed in U.S. Pat. Nos. 835,645; 1,260,299; 2,822,109; 3,386,612; 3,419,180; 3,543,801; and 3,764,037. These prior devices have not been easy to use, particularly to open and then reseal an opening which has been closed for a long period of time. The closure assembly disclosed herein includes an improved retaining structure to secure the closure device in position.

SUMMARY OF INVENTION

In accordance with the invention, a closure assembly, comprises a closure body adapted to be disposed in an opening into a structure. This closure body has a spirally disposed groove extending outwardly to a periphery of the body. A retaining member is made to be flexible when moved through the groove while resisting flexure when moved in a direction lying generally perpendicular to a plane lying parallel with the groove. Apparatus is operably connected to the closure body to move the retaining member through the groove to a position wherein a portion of retaining member engages the structure and thereby connect the closure body to the structure which secures the opening in which the closure body is disposed.

Accordingly, it is an object of the present invention to provide a closing assembly which is easy to use, simple to operate, inexpensive to manufacture and relatively rapid to open and close the opening into a structure.

Further, it is an object of the present invention to provide a method of closing an opening into a structure, comprising the steps of choosing a retaining member that is flexible when moved in a first plane while resisting flexure when moved in a second plane. The second plane is disposed generally transversely to the first plane. The retaining member is mounted in a two-dimensional spirally disposed groove provided in a closure body and the first plane lies substantially parallel to the plane of the spiral. The closure body is positioned in the opening and the retaining member comprising a plurality of retainer segments, is moved through the groove to a position wherein a portion of the retaining segments engage the structure to connect the closure body in the closure and thereby lock or secure the closure body in the opening.

Other objects and advantages of the invention will become apparent upon reading the following detailed description and upon reference to the drawings.

DESCRIPTION OF THE DRAWINGS

Drawings of a preferred embodiment of the invention are annexed hereto so that the invention may be better and more fully understood, in which:

FIG. 5 is an exploded perspective view of the preferred embodiment shown in FIG. 1; and FIG. 6 is a cross-sectional view taken along line 6—6 of FIG. 1.

Numeral references are employed to designate like parts throughout the various figures of the drawings.

DESCRIPTION OF A PREFERRED EMBODIMENT

Figure 1:
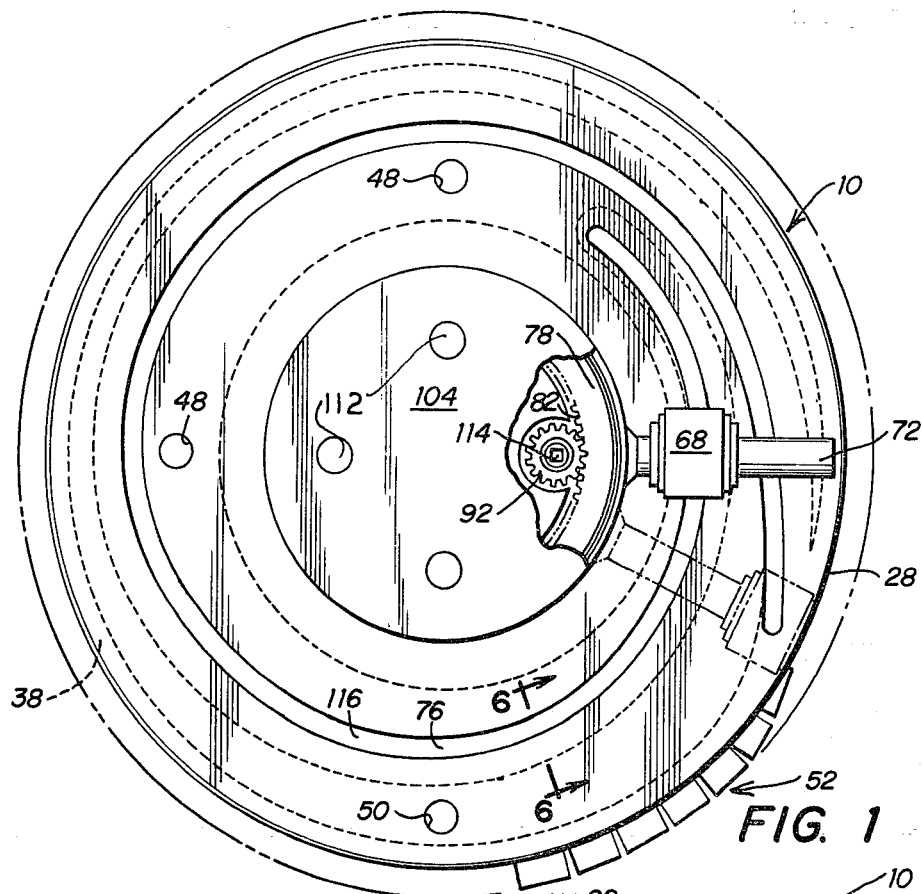
FIG. 1 is a top plan view of a preferred embodiment constructed according to the present invention, parts being broken away to more clearly illustrate details of construction.

Turning now to the drawings, there is shown a closure assembly 10 disposed within an opening 12 provided in a structure 14, such as a pipe, or pressure vessel.

Closure assembly 10 includes a closure body or plug 16 adapted to extend into opening 12, a retainer head assembly 22 supporting retainer means 54, and moving apparatus 62 to extend and retract retainer means 54.

Closure body 16 has an outer periphery 18 generally conforming to the shape of the interior surface 13 of opening 12 and preferably has a circular cross-section, which is the normal configuration for an opening into structures, such as pressure vessels, vacuum chambers, pipes and the like. Closure body 16 comprises a plate assembly 20 and a retainer head assembly 22.

Figure 2:
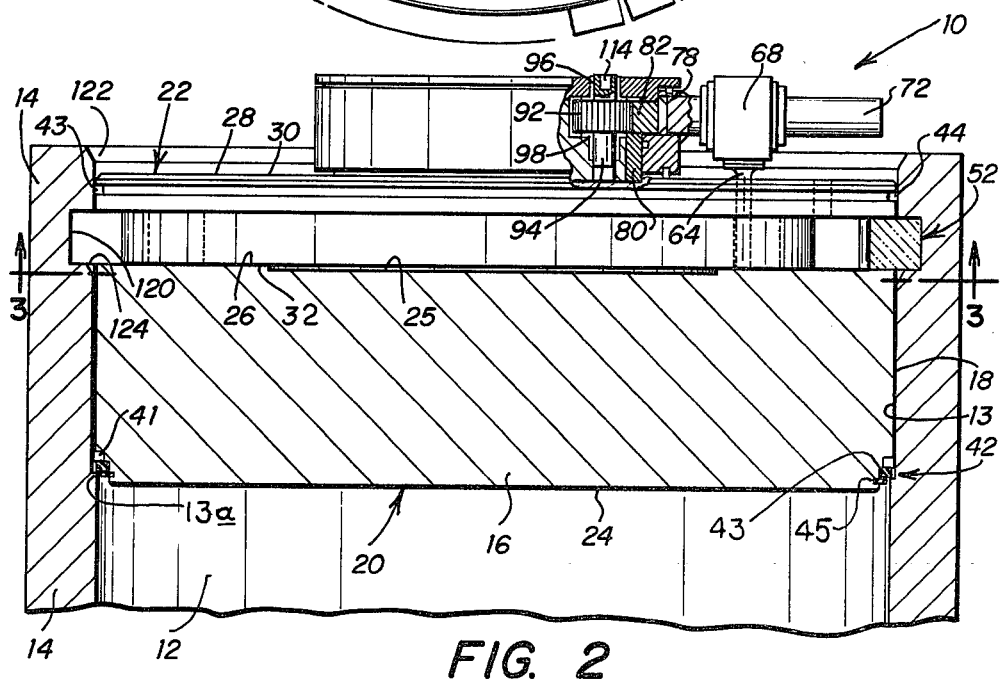
FIG. 2 is a side elevational view, partly in section, of the closure assembly shown in FIG. 1 disposed within an opening into a structure.
Figure 4:
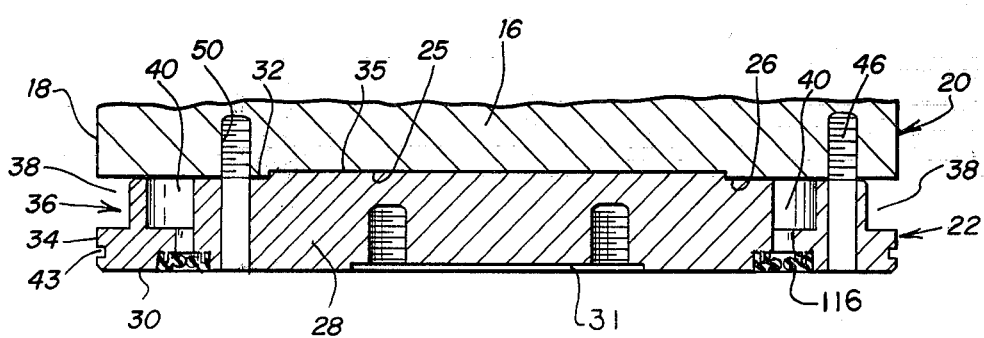
FIG. 4 is a cross-sectional view taken along line 4—4 of FIG. 3.

As best illustrated in FIGS. 2 and 4, plate assembly 20 is made from a disc-like body defined by an interiorally facing surface 24, a mounting surface 26, which faces outwardly of opening 12, and periphery 18. A central socket 25 is formed in surface 26 to locate the retainer head assembly 22 relative to the plate assembly 20. Plate assembly 20 is made of such material and has a thickness, i.e., the distance between surfaces 24 and 26, sufficient to withstand either the pressure interiorally of structure 14 in the case of pressure vessels or the pressure exteriorally of structure 14 in the case of devices such as vacuum chambers.

Figure 3:
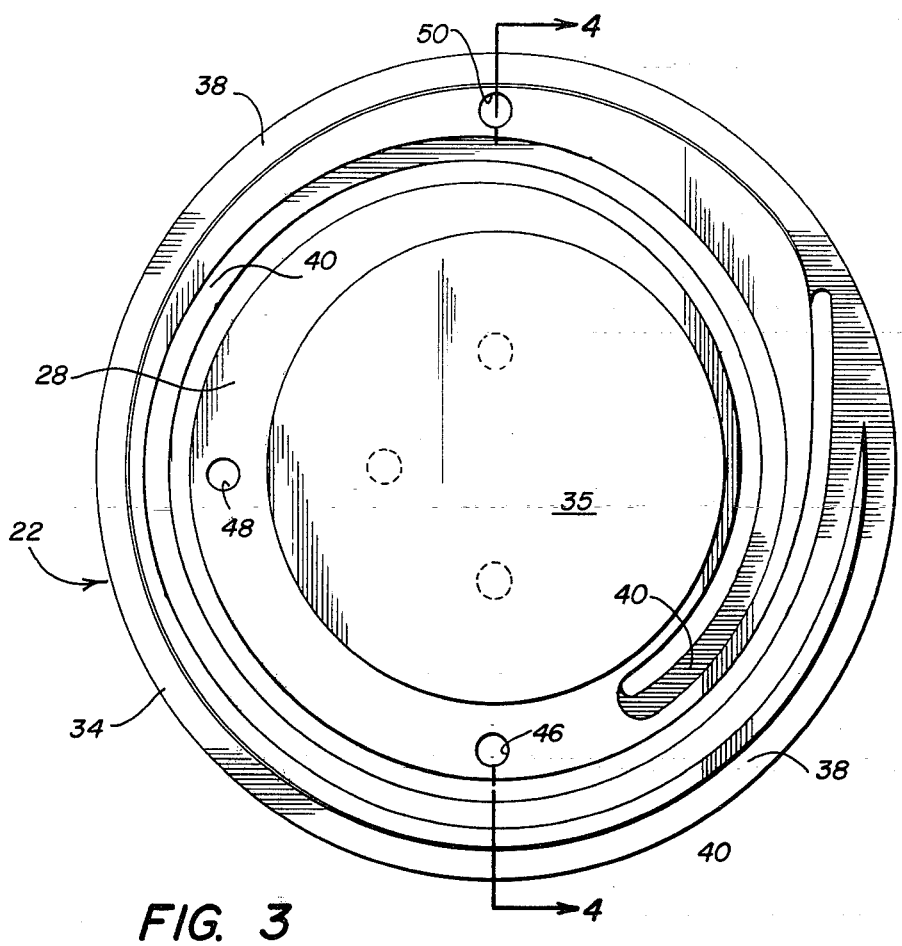
FIG. 3 is a bottom plan view of a sub-assembly of the embodiment shown in FIG. 2, looking in the direction of the arrows along line 3—3 of FIG. 2.

As best seen in FIGS. 2-4, retainer head assembly 22 includes a body 28 defined by an outer surface 30 facing outwardly of opening 12, a mounting surface 32 engaging with and generally conforming to mounting surface 26 of plate assembly 20, and peripheral surface 34 in general conformity with periphery 18 of closure body 16. A locating plug 35 extends outwardly from mounting surface 32 and extends into socket 25 in plate assembly 20 to locate the retainer head assembly 22.

A groove 36 is provided within body 28 of retainer head assembly 22 with a first portion 38 extending inwardly from the outer periphery 18 generally concentrically about the closure body and a second portion 40 spiralling inwardly from the periphery 18 toward a central axis of closure body 16. Thus, mounting surface 26 of plate assembly 20 forms a shoulder for groove 36 which extends transversely across opening 12 and thereby forms a first plane.

First and second seal assemblies 42 and 44, respectively are annularly disposed on plate assembly 20 and retainer head assembly 22 to prevent leakage around closure body 16. These assemblies preferably take the form of an O-ring seal disposed within grooves 41 and 43 extending annularly into the peripheral surfaces 18 and 34 of closure body 16.

Although plate assembly 20 and retainer head assembly 22 may be connected to one another in any conventional method, it is preferred that three bolts be used in bolt holes 46, 48 and 50.

As best illustrated in FIGS. 1, 2 and 5, a retaining member 52 is made to be flexible in a first plane parallel to surface 26 while resisting flexure in a second plane with the first and second planes lying substantially perpendicular to one another and with the first plane lying substantially parallel to the plane in groove 36 lies. As shown, flexible retaining member 52 includes a plurality of retainer segments 54 pivotally secured to one another. Each segment 54 comprises a cube shaped body 56 with a cylindrical lug 58 secured along one corner and a cylindrical socket 60 formed at another corner. Each cylindrical lug 58 on each body member 56 is received in a cylindrical socket 60 on adjacent body member 56 to form a hinge such that retaining member 52 is flexible in a first plane but is capable of carrying substantial shear loading in a perpendicular plane. Another retaining member which may be used, but is not shown, involves a plurality of plates stacked relative to one another and pivotally joined to form an anti-shear chain.

As best shown in FIGS. 1, 2 and 5, apparatus 62 is operably connected to closure body 16 for moving retaining member 52 through groove 36 to a position wherein a portion of retaining member 52 engages structure 14 to connect closure body 16 to structure 14 and thereby lock or secure closure body 16 in opening 12. This moving apparatus includes a pin 64 pivotally joined in a cylindrical socket 60 of cube shaped body 56 on the last retainer segment 54 at one end of flexible retaining member 52. The other end of pin 64 is disposed in a bearing sleeve 66, which in turn is connected to the lower portion of control sleeve 68. A second bearing sleeve 70 is connected to control sleeve 68 at an angle of approximately 90° relative to the first bearing sleeve 66. A lever 72 is slidably mounted within bearing sleeve 70 for movement of control sleeve 68 axially along lever 72 and around a planetary gear system 74. A slot 76 is provided in body 28 of retainer head assembly 22 and is disposed to generally conform to the spiral of groove 36 such that as lever 72 is rotated pin 64 will act on flexible retaining member 52 to force such member through slot 36 while control sleeve 68 moves longitudinally on lever 72.

Planetary gear system 74 includes a support ring 78 attached to one end of lever 72 and concentrically and outwardly of support sleeve 80. A ring gear 82, having teeth 84 disposed on the interior periphery and cylindrical sockets 86 disposed about the outer periphery, is concentrically secured inside support ring 78 by pins 90 in aligning sockets 86 in the outer periphery of ring gear 82 and matching sockets 88 provided in the interior surface of support ring 78. Pinion gear 92 is mounted to rotate about its central axis on shaft 94 which is rotatably supported in bearing sleeves 96 and 98. As illustrated in FIG. 5, sleeve 98 is mounted in an opening formed in cylindrical support member 100. Support sleeve 80 extends into a locating socket or recess 31 formed in outer surface 30 of retainer head assembly 22, as illustrated in FIG. 4. Bearing sleeve 96 is disposed in an opening 102 provided in cover 104, which is used to prevent foreign matter from interfering with the operation of planetary gear system 74. As shown three aligned holes 106, 108, and 110 are provided in cover 104 and in support member 100 for receiving threaded bolts 112. Shaft 94 also includes a socket opening 114 disposed in alignment and accessible through opening 102, as best illustrated in FIG. 1. Thus, when a ratchet wrench is positioned in socket opening 114, pinion gear 92 is rotated to cause movement of ring gear 82 about the axis of planetary gear system 74 which in turn imparts movement to lever 72, control sleeve 68, pin 64 and retaining member 52 between the retaining position shown in phantom outline in FIG. 1 and the retracted position shown in solid outline in FIG. 1.

As best seen in FIGS. 1 and 6, a flexible wiper member 116 having a slit 118 extending therethrough is connected to each side of retainer head assembly body 28 forming slot 76. This elastomeric member is used to prevent foreign material from entering into slot 36 which could interfere with attaching closure assembly 10 to structure 14. The particular wiper element 116 illustrated in FIG. 6 of the drawing is commercially available and comprises a rubber base 110a formed around a perforated metal core 116b to grip shoulders 26a which extend along the edges of slot 76. Bulbs 116c seal the slit 118 in front of and behind pin 64.

It is preferred that structure 14 include a slot 120 with a configuration generally conforming to the configuration of retaining member 52 to inhibit movement of closure assembly 10 when mounted to structure 14. Also, it is preferred that structure 14 have a first annularly extending beveled shoulder 122 and a second annularly extending beveled shoulder 124 so that seal assemblies 42 and 44 will not be damaged when positioning closure assembly 10 within opening 12.

As hereinbefore explained, seal assembly 42 is positioned in groove 41 formed in the outer periphery 18 of plate assembly 20 to sealingly engage the inner surface of structure 14 and the outer surface of plate assembly 20. The seal assembly is retained in position by a support ring 43 which is attached to plate assembly 20 by a snap ring 45.

As best illustrated in FIG. 2, support ring 43 engages a shoulder 13a formed in opening 12 to support the weight of the closure assembly 10 and to align groove 36 with groove 120 to permit free movement of retaining member 52 between an extended and a retracted position.

In operation, closure assembly 10 is positioned within opening 12 to engage a stop shoulder 13a machined in structure 14 such that groove 36 is aligned with groove 120. A ratched extension (not shown) from a ratchet wrench is then inserted into the socket opening 114 of shaft 94 and rotated so that lever 72 is moved around the axis of planetary gear system 74 to cause pin 64 to act upon a first end of flexible retaining member 52 and urge the second end of flexible member 52 outwardly through slot 36 into the engaging position shown in FIG. 2. In such position, any pressure which generates a force on closure body 16, will act against flexible retaining member 52 in such a fashion as to attempt to shear retainer segments 56 and such retainer segments are made of such size and material to be sufficient to resist such shear force. To quickly permit access through opening 12 into structure 14, the ratchet wrench is reversed and moved in the opposite direction to rotate pinion gear 92 in the desired direction so as to move lever 72, which carries pin 64 engaging retaining member 52, back into the spirally disposed portion 40 of groove 36 and thereby disengage retaining member 52 from contact with structure 14.

The invention having been described, what is claimed is:

1. A closure assembly, comprising: a closure body adapted to extend into an opening in a structure, said closure body having a spirally disposed groove formed therein; a retaining member made to be flexible when moved through the spirally disposed groove; and means operably connected to said closure body for moving said retaining member through the groove to a position where a portion of said retaining member engages the structure, said retaining member being made of sufficient size and material to resist any shear forces provided thereto when said closure body is mounted within the opening into said structure.

2. The closure assembly as set forth in claim 1, wherein said moving means includes a lever pivotally connected to said closure body, a sleeve movably connected to said lever, and a pin for engaging said retaining member connected to said sleeve.

3. The closure member as set forth in claim 2, wherein said moving means further includes a planetary gear system operably connected to said closure body for providing a force to the lever for moving the retaining member through the groove.

4. The closure assembly as set forth in claim 3, including sealing means connected to said closure body for preventing leakage around a periphery of said closure body when connected to the structure.

5. The closure assembly as set forth in claim 3, wherein said retaining member includes a plurality of metallic links connected to one another and adapted to be received in a slot provided in the structure.

6. A closure assembly as set forth in claim 1, wherein said retaining member includes a plurality of metallic links connected to one another and adapted to be received in a slot provided in the structure.

7. A closure assembly as set forth in claim 1, including sealing means connected to said closure body for preventing leakage around the periphery of said closure body when connected to the structure.

8. A closure assembly as set forth in claim 1, wherein the structure is in communication with a pressure vessel.

9. A closure assembly as set forth in claim 1, wherein said closure body includes a plate assembly and a head assembly connected to the plate assembly, an annular groove being provided in the periphery of the plate assembly, and seal means disposed in the annular groove for preventing leakage around the periphery of said closure body.

10. A closure assembly as set forth in claim 1, wherein said closure body includes a plate assembly and a head assembly connected to said plate assembly, a slot being disposed in the head assembly to provide access into the groove to said retaining means, and seal means connected to the head for limting access of foreign material into the groove.

11. A closure assembly as set forth in claim 10, wherein said moving means includes a lever pivotally connected to the head assembly, a sleeve movably connected along said lever, and a pin for engaging said retaining member through the slot connected to said sleeve.

12. A closure assembly as set forth in claim 11, wherein said moving means further includes a planetary gear system operably connected to the head assembly for providing a force to the lever for moving said retaining member through the groove.

13. A method of closing an opening into a structure, comprising the steps of: choosing a retaining member that is flexible when moved in a first plane while resisting flexure when moved in a second plane which is disposed transversely to the first plane;

mounting the retaining member in a two-dimensional, spirally disposed groove provided in a closure body with the first plane lying substantially parallel to the plane of the spiral;

positioning the closure body in the opening; and moving the retaining member through the groove to a position wherein a portion of the retaining member engages the structure to connect the closure body to the structure and thereby lock the closure body in the opening.

14. A method of closing an opening into a structure, comprising the steps of:

providing a closure body with a groove spirally disposed therein;

choosing a retaining member that is sufficiently flexible to permit movement within said spiral groove while being inflexible when a shear force is applied thereto;

mounting the retaining member in the groove;

positioning the closure body in the opening; and moving the retaining member through the groove to a position wherein a portion of the retaining member engages the structure such that when pressure is applied against the closure body the force generated thereby will act upon the retaining member in the shear direction which thereby prevents movement of said clsore body relative to the structure.

* * * * *